United States Patent
Ye et al.

(10) Patent No.: US 9,480,109 B2
(45) Date of Patent: Oct. 25, 2016

(54) POWER SOURCE MODULE FOR LED LAMP

(71) Applicants: JIAXING SUPER LIGHTING ELECTRIC APPLIANCE CO., LTD, Jiaxing, Zhejiang (CN); SHANGHAI LUMIXESS TECHNOLOGY CO. LTD, Shanghai (CN)

(72) Inventors: Qi Feng Ye, Zhejiang (CN); Tao Jiang, Zhejiang (CN); Yue-Qiang Zhang, Zhejiang (CN); Zhong Chen, Shanghai (CN)

(73) Assignee: JIAXING SUPER LIGHTING ELECTRIC APPLIANCE CO., LTI, Jiaxing, Zhejiang (CN)

( * ) Notice: Subject to any disclaimer, the term of this patent is extended or adjusted under 35 U.S.C. 154(b) by 0 days.

(21) Appl. No.: 14/699,138

(22) Filed: Apr. 29, 2015

(65) Prior Publication Data

US 2016/0102813 A1  Apr. 14, 2016

(30) Foreign Application Priority Data

Oct. 14, 2014 (CN) ..................... 2014 2 0602526 U

(51) Int. Cl.
  *H05B 33/08* (2006.01)
  *F21V 23/02* (2006.01)
  *F21K 99/00* (2016.01)
  *F21V 23/00* (2015.01)

(52) U.S. Cl.
  CPC ............. *H05B 33/0812* (2013.01); *F21K 9/17* (2013.01); *F21V 23/009* (2013.01); *F21V 23/023* (2013.01); *H05B 33/0809* (2013.01)

(58) Field of Classification Search
  CPC .......... H05B 33/0809; H05B 33/0815; H05B 33/0803; H05B 33/0812; H05B 33/0806; H05B 33/0884; H05B 33/0887; H05B 33/089; H05B 37/02; Y02B 20/386; Y02B 20/40; Y02B 20/186; Y02B 20/342; Y02B 20/346; F21K 9/17; F21V 23/009
  See application file for complete search history.

(56) References Cited

U.S. PATENT DOCUMENTS

| | | | |
|---|---|---|---|
| 8,525,427 B2* | 9/2013 | Samoilenko et al. | H05B 33/0809 315/185 R |
| 8,648,542 B2* | 2/2014 | Kim | H05B 33/0809 315/185 R |
| 9,210,744 B2 | 12/2015 | Del Carmen, Jr. et al. | |
| 2011/0057572 A1 | 3/2011 | Kit et al. | |
| 2011/0121756 A1 | 5/2011 | Thomas et al. | |
| 2011/0181190 A1* | 7/2011 | Lin | H05B 33/0809 315/127 |
| 2012/0299501 A1 | 11/2012 | Kost et al. | |
| 2015/0173138 A1 | 6/2015 | Roberts | |
| 2015/0231171 A1* | 8/2015 | Gellman | A61K 31/785 424/78.3 |
| 2016/0081147 A1 | 3/2016 | Guang | |

* cited by examiner

*Primary Examiner* — Vibol Tan
(74) *Attorney, Agent, or Firm* — Muir Patent Law, PLLC

(57) ABSTRACT

A power source module for a LED lamp includes a filament-simulating circuit, a current limiting circuit, a rectifier, a filter, and a discharging circuit electrically connected to each other and a LED in the LED lamp. The filament-simulating circuit simulates a filament before the LED to pass through the pre-heating process of the electrical ballast in a fluorescent lamp base. The current limiting circuit, the rectifier, and the filter limit, rectify and filter the current from an external power source in the fluorescent lamp base to output a high frequency, direct current to drive the LED. The discharging circuit discharges the energy after turning the power switch off to prevent the LED lamp from flicker. Therefore, the power source module enables the LED lamp to be installed on the traditional fluorescent lamp base without modifying the circuit in the base.

20 Claims, 3 Drawing Sheets

POWER SOURCE MODULE FOR LED LAMP

PRIORITY CLAIM

This application claims the benefit of the filing date of Chinese Patent Application No. 201420602526.2, filed Oct. 17, 2014, entitled "POWER SOURCE MODULE FOR LED LAMP," and the contents of which are hereby incorporated by reference in their entirety.

FIELD OF THE INVENTION

The invention relates to a power source module for a LED lamp, and more particularly, the invention relates to a power source module for enabling the LED lamp installed on the traditional fluorescent lamp base.

BACKGROUND

The fluorescent lamps have been used wildly in the world for illumination. The traditional fluorescent lamp is detachably installed on a fluorescent lamp base to receive the power from the power source in the base to emit light. According to the principle of luminosity of the traditional fluorescent lamp, the fluorescent lamp base has to provide a starter and a ballast to drive the traditional fluorescent lamp. The starter is used for heating filaments in the fluorescent lamp and raising a voltage between the two terminals of the fluorescent lamp, so as to ignite the fluorescent lamp to light. The traditional fluorescent lamp has a negative incremental impedance characteristic, so that it needs the ballast to limit the amount of the current for preventing the fluorescent lamp from damage.

The traditional fluorescent lamp is filled with Argon, Neon, Krypton at low atmospheric pressure, and a bit mercury vapor which is harmful. The traditional fluorescent lamp also has the disadvantages of high power consumption and high heat generation. Compared to the traditional fluorescent lamp, the LED lamp has the advantages of absence of mercury pollution, more power saving, and long life. Therefore, the LED lamps are adopted more widely in the world recently to replace the traditional fluorescent lamp.

To replace the traditional fluorescent lamp by the LED lamp, the original circuit included in the fluorescent lamp base might need to be modified to adapt the LED lamp. There are two types of the fluorescent lamp bases: one adopts an independent starter and an inductance as the ballast; the other adopts an electrical ballast including the starter therein. The inductance opposes the change in current and so the inductance ballast would attempt to keep the current of the LED lamp in a fixed current substantially. The starter and the electrical ballast generate a gaseous electric discharge in the fluorescent lamp by raising the voltage, and so it would cause the LED lamp to burn away. For the first type of the fluorescent lamp base, the LED lamp can be installed on the base directly and operates normally by taking the starter away and retaining the inductance ballast, and the starter in this type of fluorescent lamp base can be easily took away by the user. On the contrary, the electrical ballast needs to be removed away by the user, and further the circuit in the fluorescent lamp base must be modified correspondingly for the LED lamp.

The modification to the electric ballast type fluorescent lamp base is complicated to the user, even to the professional. Also, it needs manpower and material resources to make the modification. The inconvenience of the modification to the electric ballast keeps the users from replacing the traditional fluorescent lamp with the LED lamp.

Therefore, a novel means for solving the above problem is needed.

SUMMARY OF THE INVENTION

One object of the present invention is to provide a power source module for a LED lamp for use in a fluorescent lamp base including a ballast.

According to an embodiment of the invention, the power source module includes a filament-simulating circuit, a first rectifier, and a filter. The filament-simulating circuit is electrically connected to a first and a second bi-pin terminals of the LED lamp. Each of the first and the second bi-pin terminals has a current flowing from one pin to the other pin via the filament-simulating circuit during a pre-heat process executed by the ballast of the fluorescent lamp base. The first rectifier is electrically connected to the first bi-pin terminal for rectifying the current from the first bi-pin terminal. The filter is electrically connected between the first rectifier and at least one LED of the LED lamp for smoothing the current from the first rectifier and then outputting the current to the LED.

The power source module prevents the LED lamp from burning away by a high voltage, so as to enable the LED lamp installed on the traditional fluorescent lamp base to operate normally without modifying the circuit in the base.

Another object of the present invention is to provide a power source module for a LED lamp having a current limiting circuit to protect the LED lamp.

According to another embodiment, the power source module includes a current limiting circuit, a first rectifier, and a filter. The current limiting circuit is electrically connected to a first terminal of the LED lamp for limiting a circuit from the terminal. The first rectifier is electrically connected to the current limiting circuit, and the filter is electrically connected to the first rectifier, so as to rectifying and smoothing the current.

Another object of the present invention is to provide a power source module for a LED lamp having a discharge circuit to prevent the LED lamp from flicker when turning off the LED lamp.

According to another embodiment, the power source module includes a rectifier, a filter, and a discharge circuit. The rectifier electrically connected to the terminals of the LED lamp for receiving a current, the filter is electrically connected between the rectifier and at least one LED of the LED lamp to storing energy for smoothing the current, and the discharging circuit is electrically connected to the filter in parallel for discharging the energy in the filter.

On the advantages and the spirit of the invention, it can be understood further by the following invention descriptions and attached drawings.

DETAILED DESCRIPTION

Figure 1:
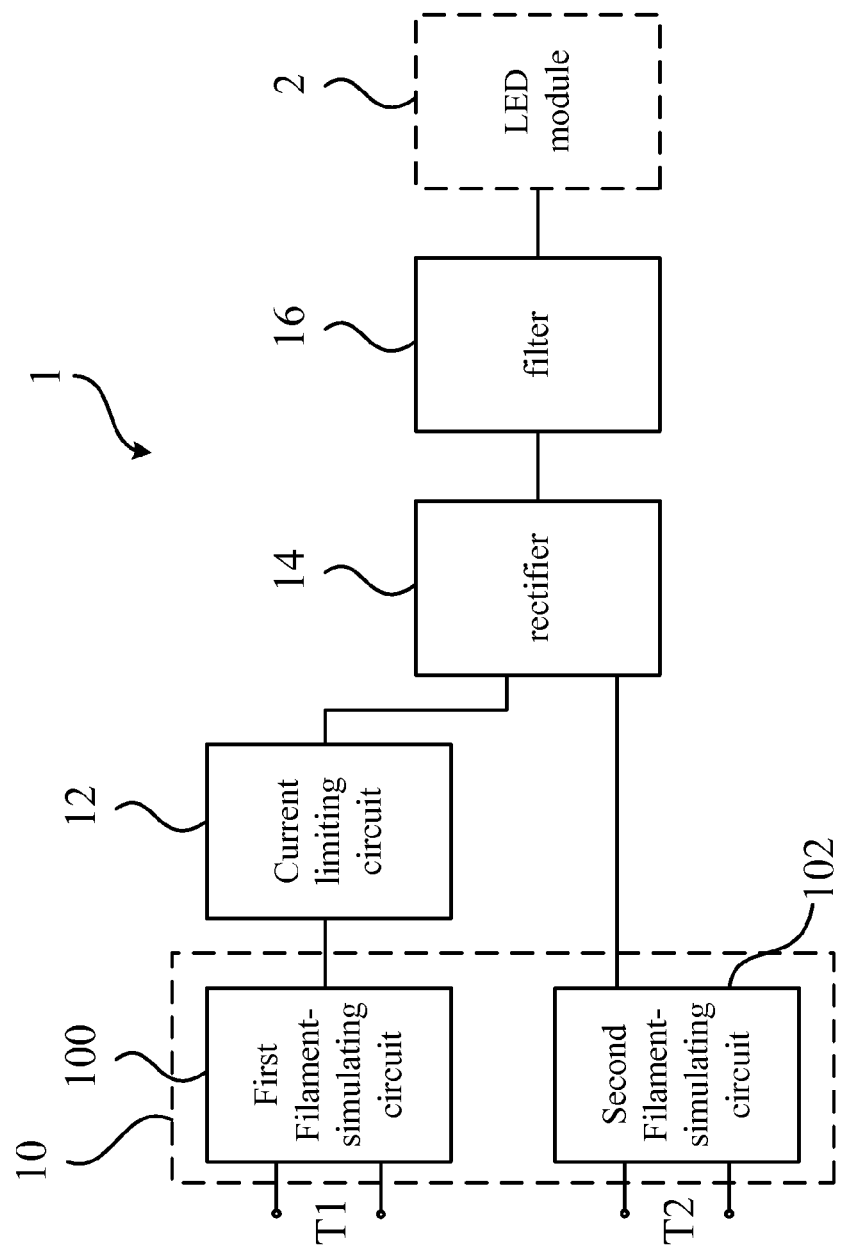
FIG. 1 is a function block diagram illustrating a power source module for a LED lamp according to an embodiment of the invention.

Please refer to FIG. 1. FIG. 1 is a function block diagram illustrating a power source module 1 for a LED lamp according to an embodiment of the invention. The power source module 1 may be configured inside a casing of the LED lamp to connect a LED module 2 of the LED lamp to terminals of the LED lamp. The LED module includes at least one LED.

As shown in FIG. 1, the power source module 1 includes a filament-simulating unit 10, a current limiting circuit 12, a rectifier 14, and a filter 16. The filament-simulating unit 10 is electrically connected to the terminals of the LED lamp. The terminals of the LED lamp includes a first bi-pin terminal T1 and a second bi-pin terminal T2, and each of the first and the second bin-pin terminals T1, T2 further include two pins. These pins of the first and the second bin-pin terminals T1, T2 are configured to be detachably installed on the traditional fluorescent lamp base for receiving a current therefrom. The filament-simulating unit 10 also includes a first filament-simulating circuit 100 and a second filament-simulating circuit 102 connected to the pins of the first bi-pin terminal T1 and the second bi-pin terminal T2.

The first filament-simulating circuit 100 and the second filament-simulating circuit 102 are able to receive current(s) via the bi-pin terminals T1, T2 and power source ends of the fluorescent lamp base from an external power source. During a pre-heat process executed by the ballast of the fluorescent lamp base a current flows from one pin to the other pin of the first bi-pin terminal T1 via the first filament-simulating circuit 100, and similarly a current from one pin to the other pin of the second bi-pin terminal T2 via the second filament-simulating circuit 102 respectively. The current limiting circuit 12 is electrically connected to the first bi-pin terminals T1, and used for limiting the current from the first bi-pin terminal T1 to be in a suitable range for driving the LED module 2. The rectifier 14 is electrically connected between the current limiting circuit 12 and the second filament-simulating circuit 102. The rectifier 14 is used for rectifying the current from the bi-pin terminals T1, T2. The current inputted from the external power source is an alternating current, and the rectifier 14 rectifies the alternating current to be a direct current. The filter 16 is electrically connected to the rectifier 14 for filtering the rectified current and outputting the filtered current to the LED module 2.

The ballast may execute a pre-heat process to the filaments of the traditional fluorescent lamp for pre-heating the filaments. The filament-simulating unit 10 can simulate a filament of the traditional fluorescent lamp, so as to prevent the ballast from erroneously judging that the filaments are open-circuited or short-circuited during the pre-heating process of the ballast.

Figure 2:
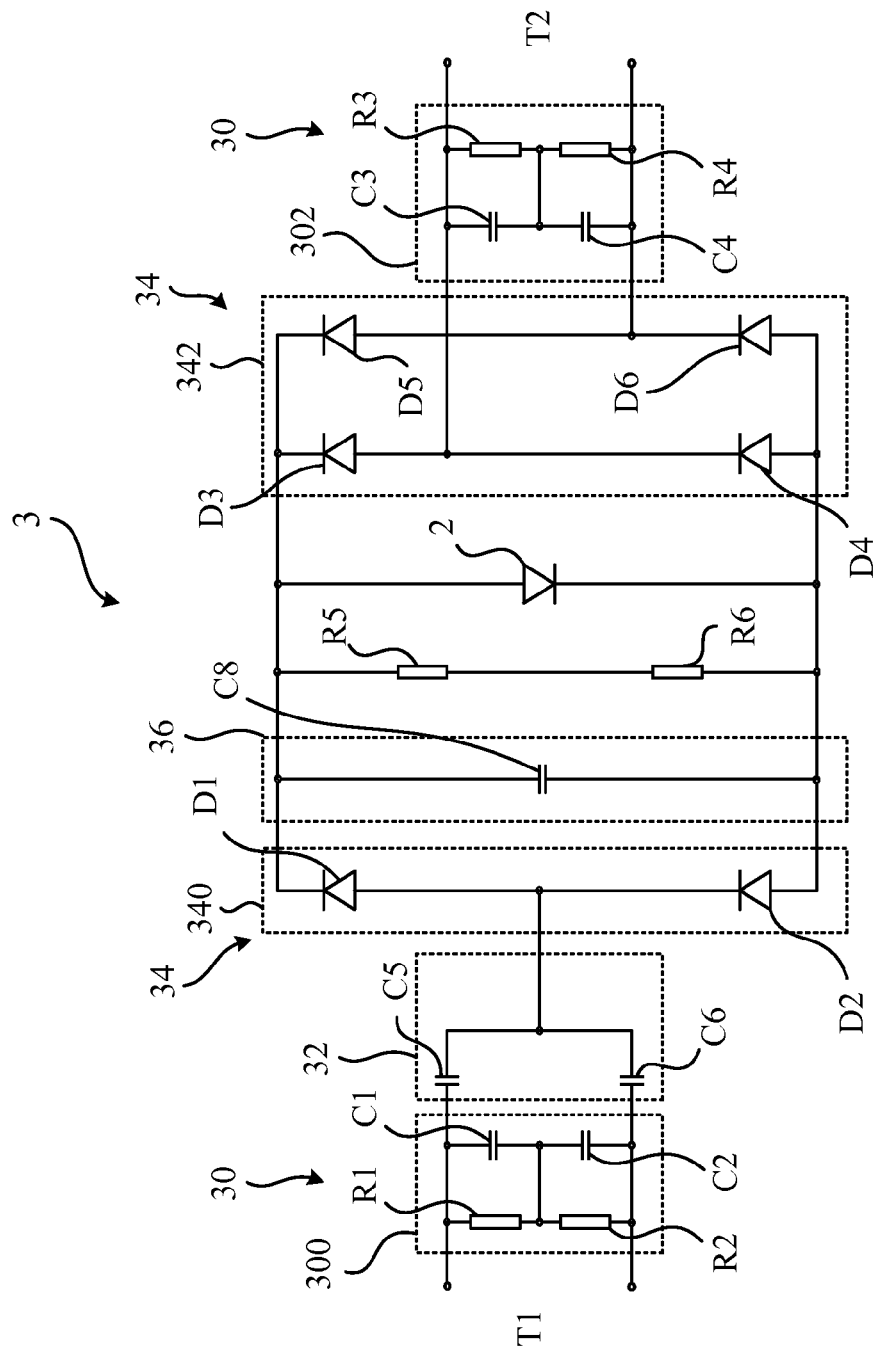
FIG. 2 is a schematic diagram illustrating a power source module for a LED lamp according to another embodiment of the invention.

Please refer to FIG. 2. FIG. 2 is a schematic diagram illustrating a power source module 3 for a LED lamp according to another embodiment of the invention.

As shown in FIG. 2, the power source module 3 includes a filament-simulating unit 30, a current limiting circuit 32, a rectifier 34, and a filter 36 electrically connected between the LED module 2 and two bi-pin terminals T1 and T2. It should be noted that although FIG. 2 only shows one LED of the LED module 2, the LED module 2 may include more than one LED connected in parallel and/or in series in another embodiment. The filament-simulating unit 30 includes a first filament-simulating circuit 300 connected to the first bi-pin terminal T1 and a second filament-simulating circuit 302 connected to the second bi-pin terminal T2.

The first filament-simulating circuit 300 includes a pair of resistances R1, R2 and a pair of capacitances C1, C2. The resistances R1 and R2 are connected in series, and the capacitances C1 and C2 are connected in series. The pair of resistances and the pair of capacitances are connected in parallel between the pins of the first bi-pin terminal T1. The connection point between resistances R1, R2 is electrically connected to the connection point between capacitances C1, C2. Thereby, when one of the resistances R1, R2 and the capacitances C1, C2 is open circuited, the first filament-simulating circuit 300 still works.

Similarly, the second filament-simulating circuit 302 includes a pair of resistances R3, R4 and a pair of capacitances C3, C4. The connecting relations of R3, R4, T3, T4, and the pins of the second bi-pin terminal T2 are similar to those of the first filament-simulating circuit 300 and the first bi-pin terminal T1, as shown in FIG. 2.

The values of the resistances R1, R2, R3, R4 and the capacitances C1, C2, C3, C4 could be matched in a reasonable range, for example, when the ballast provides a high frequency signal into the power source module 3, the impedance of the first pair of resistances R1, R2 could be ten times more than that of the first pair of capacitances C1, C2, and an impedance of the second pair of resistances R3, R4 could be ten times more than that of the second pair of capacitances. In this embodiment, the value of the resistances could be 100 KΩ and the value of the capacitances could be 220 nF. The resistances R1, R2, R3, R4 and the capacitances C1, C2, C3, C4 could be electrically connected to the ballast in the traditional fluorescent lamp base via the first bi-pin terminal T1 and the second bi-pin terminal T2, to simulate the filaments during the pre-heating process of the ballast. After the pre-heating process, the ballast enters a normal operation state, and outputs an alternating current with a high frequency, e.g., 45 KHz, to the current limiting circuit 32.

The current limiting circuit 32 includes at least one capacitance, and in this embodiment, capacitances C5 and C6. The capacitances C5 and C6 may be film capacitances to increase the reliability of the power source module 3. One end of the capacitance C5 is connected to one of the pins of the first bi-pin terminal T1. One end of the capacitance C6 is connected to the other of the pins of the first bi-pin terminal T1. The other ends of the capacitance C5 and the capacitance C6 are connected together, and connected to the rectifier 34. The values of the capacitances C5 and C6 can be matched to limit the value the current in a reasonable range when the ballast provides a high voltage to the LED module 2. The reasonable range is defined to the current range which drives the LED module 2 to operate normally, so that the reasonable range would vary with different types of LED or LED array. In practice, the reasonable range could be under 217 mA. The capacitances C5 and C6 are connected to different pins of the first bi-pin terminal T1, so that the value of the current from any one of the pins is assured to be limited in the reasonable range.

Figure 3:
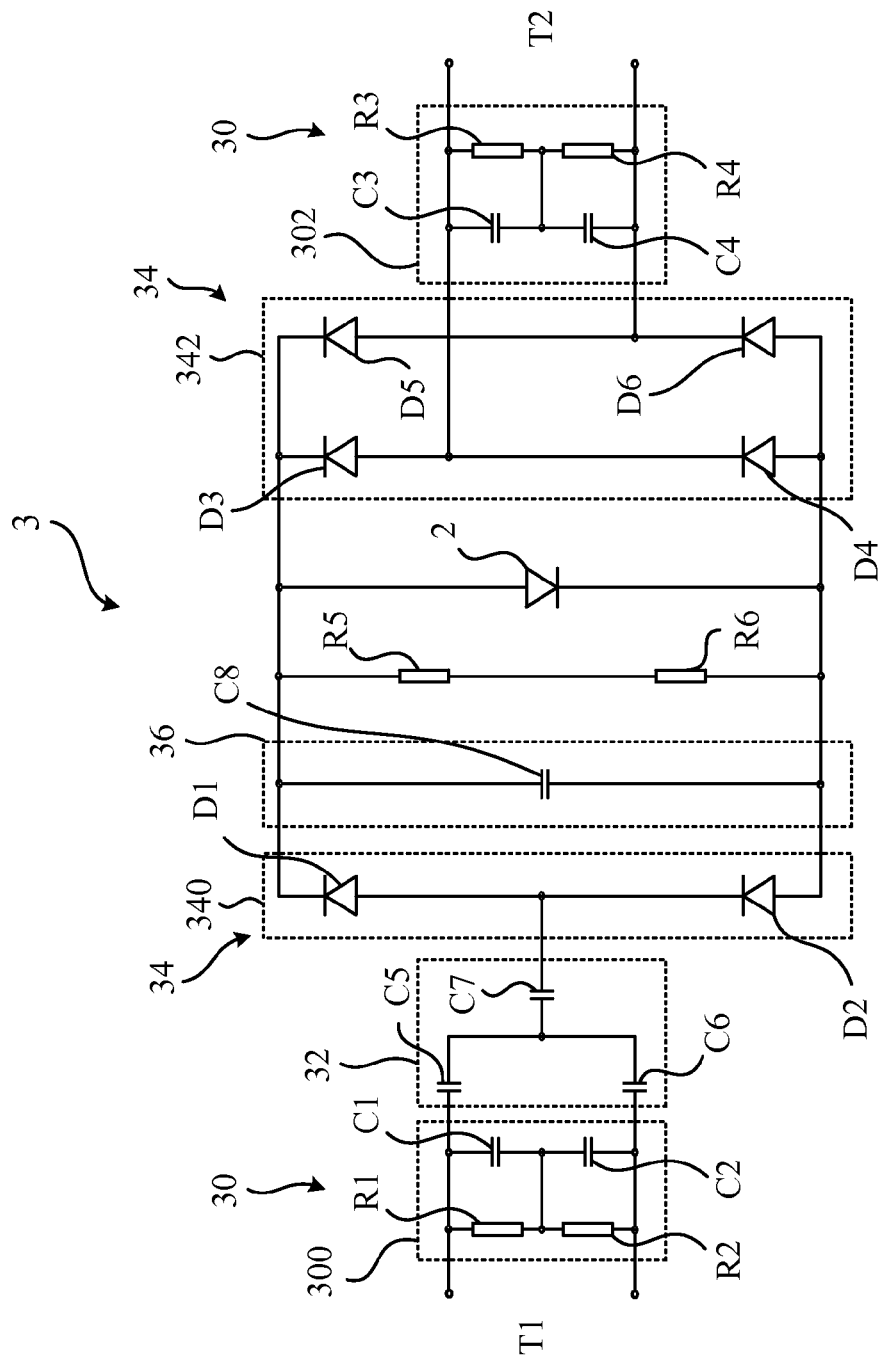
FIG. 3 is a schematic diagram illustrating a power source module for a LED lamp according to another embodiment of the invention.

Please refer to FIG. 3. FIG. 3 is a schematic diagram illustrating a power source module 3 for a LED lamp according to another embodiment of the invention. As shown in FIG. 3, the difference between this embodiment and the last embodiment is that the current limiting circuit 32 further includes the third capacitance C7 connected between the capacitances C5 and C6 and the rectifier 34, so as to ensure the value of the current in the reasonable range even if one of the capacitances C5 and C6 is damaged. In a preferred embodiment, the values of the capacitances C5, C6, C7 are in the range of 0.47 nF to 12 nF, and in this embodiment, the values of the capacitances C5, C6 are 3.3 nF, and the value of the capacitance C7 is 8.2 nF.

The rectifier 34 includes a first rectifier 340 and a second rectifier 342 electrically connected to the current limiting circuit 32 and the second filament-simulating circuit 302 respectively for receiving and rectifying the current from the current limiting circuit 32. Furthermore, the rectifier 34 is connected to the LED module 2 for outputting the rectified current thereto. The rectifier 34 includes six diodes D1, D2, D3, D4, D5, and D6, wherein the first rectifier 340 includes diodes D1, D2 electrically connected in series and the second rectifier 342 includes diodes D3, D4, D5, and D6 electrically connected to each other to form a bridge rectifier. In the embodiment shown in FIG. 2, the first diode D1 has an anode connected to the junction point of the capacitances C5 and C6 and a cathode thereof connected to the anode of the LED module 2. In the embodiment shown in FIG. 3, the first diode D1 has an anode connected to the third capacitance C7 and a cathode thereof connected to the anode of the LED module 2. The second diode D2 has an anode connected to the cathode of the LED module 2 and a cathode thereof connected to the third capacitance C7. A current may flow from the LED module 2 to one pin of the first bi-pin terminal T1 through the diode D2 and the current limiting circuit 32, or from one pin of the first bi-pin terminal T1 to the LED module 2 through the diode D1 and the current limiting circuit 32. The third diode D3 has an anode connecting to one of the pins of the second bi-pin terminal T2 and a cathode connected to the anode of the LED module 2. The fourth diode D4 has an anode connected to the cathode of the LED module 2 and a cathode connected to the anode of the third diode D3. The fifth diode D5 has an anode connected to the other of the pins of the second bi-pin terminal T2 and a cathode connected to the anode of the LED module 2. The sixth diode D6 has an anode connected to the cathode of the LED module 2 and a cathode connected to the anode of the fifth diode D5.

The diodes of the rectifier 34 make a full-wave rectification to the current limited by the current limiting circuit 32, to output a rectified, direct current with a double frequency. For example, the current from the current limiting circuit 32 was an alternating current with frequency of 45 KHz, and the rectified current output by the rectifier 34 is a direct current with frequency of 90 KHz. The rating current/voltage values of the diodes of the rectifier 34 are 1 A/1000V, in this embodiment.

The filter 36 includes a filtering capacitance C8 connected to the rectifier 32 and the LED module 2 in parallel, as shown in FIGS. 2 and 3. The filtering capacitance C8 is used for storing energy from the rectifier 34 to filter and smooth the rectified current from the rectifier 34, and then outputting the filtered current to drive the LED module 2. The value of the filtering capacitance C8 is 680 nF, in this embodiment.

In this embodiment, the power source module 3 further includes a pair of discharging resistances R5 and R6 connected in series. The discharging resistance pair is connected to the filter 36 and the LED module 2 in parallel. The discharging resistances R5 and R6 can discharge the energy stored in the filtering capacitance C8 rapidly to prevent the LED lamp from flicker when turning off the power inputted to the power source module.

As described above, the power source module for the LED lamp simulates the filaments to prevent the ballast from stopping supplying power due to the error judgement during the pre-heating process. The current provided by the external power source after the pre-heating process can be limited, rectified, and filtered by the power source module to a suitable direct current to drive the LED, and the energy can be discharge rapidly after turning power off. Therefore, the power source module enables the LED lamp installed on the traditional fluorescent lamp base to operate normally without modifying the circuit in the base.

Although the present invention has been illustrated and described with reference to the preferred embodiment thereof, it should be understood that it is in no way limited to the details of such embodiment but is capable of numerous modifications within the scope of the appended claims.

The invention claimed is:

1. A power source module for a LED lamp comprising:
   a current limiting circuit, electrically connected to a first bi-pin terminal of the LED lamp for limiting a current from the terminal, the current limiting circuit comprising:
     a first capacitance, one end of the first capacitance being electrically connected to one pin of the first bi-pin terminal;
     a second capacitance, one end of the second capacitance being electrically connected to the other pin of the first bi-pin terminal, and the other end of the second capacitance being electrically connected to the other end of the first capacitance; and
     a third capacitance, one end of the third capacitance being electrically connected to the other ends of the first capacitance and the second capacitance;
   a first rectifier, electrically connected to the current limiting circuit for rectifying the current from the current limiting circuit; and
   a filter, electrically connected between the first rectifier and at least one LED of the LED lamp for smoothing the current from the first rectifier.

2. A power source module for a LED lamp comprising:
   a current limiting circuit, electrically connected to a first bi-pin terminal of the LED lamp for limiting a current from the bi-pin terminal, the current limiting circuit comprising:
     a first capacitance, one end of the first capacitance being electrically connected to one pin of the first bi-pin terminal; and
     a second capacitance, one end of the second capacitance being electrically connected to the other pin of the first bi-pin terminal, and the other end of the second capacitance being electrically connected to the other end of the first capacitance;
   a first rectifier, electrically connected to the current limiting circuit, for rectifying the current from the current limiting circuit; and
   a filter, electrically connected between the first rectifier and at least one LED of the LED lamp for smoothing the current from the first rectifier;
   wherein the first rectifier comprises two diodes electrically connected in series and the connection node of the two diodes is electrically connected to the other ends of the first and second capacitances.

3. The power source module of claim 1, further comprising a discharging circuit, electrically connected to the filter in parallel for discharging the filter.

4. A power source module for a LED lamp comprising:
   a current limiting circuit, electrically connected to a first bi-pin terminal of the LED lamp for limiting a current from the bi-pin terminal, the current limiting circuit comprising:
     a first capacitance, one end of the first capacitance being electrically connected to one pin of the first bi-pin terminal; and a second capacitance, one end of the second capacitance being electrically connected to the other pin of the first bi-pin terminal, and the other end of the second capacitance being electrically connected to the other end of the first capacitance;

a first rectifier, electrically connected to the current limiting circuit, for rectifying the current from the current limiting circuit;

a filter, electrically connected between the first rectifier and at least one LED of the LED lamp for smoothing the current from the first rectifier; and a filament-simulating circuit, electrically connected to the first and a second bi-pin terminals of the LED lamp, each of the first and the second bi-pin terminals having a current flowing from one pin to the other pin of the respective bi-pin terminal via the filament-simulating circuit during a pre-heat process executed by the ballast of the fluorescent lamp base.

5. The power source module of claim 4, wherein the filament-simulating circuit comprises:

a first filament-simulating circuit, comprising a first capacitance element electrically connected between two pins of the first bi-pin terminal; and a second filament-simulating circuit, comprising a second capacitance element electrically connected between two pins of the second bi-pin terminal.

6. The power source module of claim 5, wherein:

the first filament-simulating circuit further comprises a first pair of resistances electrically connected in series, the first capacitance element comprises a first pair of capacitances electrically connected in series, the first pair of resistances and the first pair of capacitances electrically connected in parallel between two pins of the first bi-pin terminal, and the connection point between the first pair of resistances being electrically connected to the connection point between the first pair of capacitances; and the second filament-simulating circuit further comprises a second pair of resistances electrically connected in series, the second capacitance element comprises a second pair of capacitances electrically connected in series, the second pair of resistances and the second pair of capacitances electrically connected in parallel between two pins of the second bi-pin terminal, and the connection point between the second pair of resistances being electrically connected to the connection point between the second pair of capacitances.

7. The power source module of claim 6, wherein an impedance of the first pair of resistances is ten times more than that of the first pair of capacitances, and an impedance of the second pair of resistances is ten times more than that of the second pair of capacitances.

8. The power source module of claim 5, wherein the first rectifier comprises two diodes electrically connected in series, and the first rectifier is electrically connected with the first filament-simulating circuit in parallel.

9. The power source module of claim 5, wherein the first rectifier comprises two diodes electrically connected in series and the connection node of the two diodes is coupled to the current limiting circuit, wherein a current flows from the at least one LED to one pin of the first bi-pin terminal through one of the two diodes and the current limiting circuit, or from one pin of the first bi-pin terminal to the at least one LED through the other of the two diodes and the current limiting circuit.

10. The power source module of claim 9, wherein the current limiting circuit comprises at least a capacitance.

11. The power source module of claim 8, further comprising a second rectifier, wherein the second rectifier is a bridge rectifier electrically connected with the second filament-simulating circuit in parallel.

12. The power source module of claim 1, wherein the filter comprises a filtering capacitance electrically connected with the at least one LED.

13. The power source module of claim 4, wherein the power source module is configured inside a casing of the LED lamp.

14. The power source module of claim 4, further comprising a discharging circuit, electrically connected to the filter in parallel for discharging the filter.

15. The power source module of claim 1, further comprising a discharging circuit electrically connected to the filter in parallel for discharging the filter.

16. The power source module of claim 1, further comprising a filament-simulating circuit, electrically connected to the first bi-pin terminal and a second bi-pin terminal of the LED lamp, each of the first and the second bi-pin terminals having a current flowing from one pin to the other pin of the respective bi-pin terminal via the filament-simulating circuit during a pre-heat process executed by the ballast of the fluorescent lamp base.

17. The power source module of claim 16, wherein the filament-simulating circuit comprises:

a first filament-simulating circuit, comprising a first capacitance element electrically connected between two pins of the first bi-pin terminal; and a second filament-simulating circuit, comprising a second capacitance element electrically connected between two pins of the second bi-pin terminal.

18. The power source module of claim 17, wherein:

the first filament-simulating circuit further comprises a first pair of resistances electrically connected in series, the first capacitance element comprises a first pair of capacitances electrically connected in series, the first pair of resistances and the first pair of capacitances electrically connected in parallel between two pins of the first bi-pin terminal, and the connection point between the first pair of resistances being electrically connected to the connection point between the first pair of capacitances; and the second filament-simulating circuit further comprises a second pair of resistances electrically connected in series, the second capacitance element comprises a second pair of capacitances electrically connected in series, the second pair of resistances and the second pair of capacitances electrically connected in parallel between two pins of the second bi-pin terminal, and the connection point between the second pair of resistances being electrically connected to the connection point between the second pair of capacitances.

19. The power source module of claim 18, wherein an impedance of the first pair of resistances is ten times more than that of the first pair of capacitances, and an impedance of the second pair of resistances is ten times more than that of the second pair of capacitances.

20. The power source module of claim 17, wherein the first rectifier comprises two diodes electrically connected in series, and the first rectifier is electrically connected with the first filament-simulating circuit in parallel.

* * * * *

UNITED STATES PATENT AND TRADEMARK OFFICE
CERTIFICATE OF CORRECTION

| | | |
|---|---|---|
| PATENT NO. | : 9,480,109 B2 | Page 1 of 1 |
| APPLICATION NO. | : 14/699138 | |
| DATED | : October 25, 2016 | |
| INVENTOR(S) | : Qi Feng Ye et al. | |

It is certified that error appears in the above-identified patent and that said Letters Patent is hereby corrected as shown below:

On the Title Page

Item (73) Assignee is listed as:
JIAXING SUPER LIGHTING ELECTRIC APPLIANCE CO., LTI
Jiaxing, Zhejiang (CN)

Assignee should be listed as:
JIAXING SUPER LIGHTING ELECTRIC APPLIANCE CO., LTD.
Jiaxing, Zhejiang (CN)

Signed and Sealed this
Fifth Day of September, 2017

Joseph Matal
*Performing the Functions and Duties of the*
*Under Secretary of Commerce for Intellectual Property and*
*Director of the United States Patent and Trademark Office*